United States Patent [19]

Josephy et al.

[11] 4,356,375

[45] Oct. 26, 1982

[54] PROCESS FOR PRODUCING LINES OF WEAKNESS IN THE PROTECTIVE BACKING OF AN ADHESIVE LAMINATE

[75] Inventors: Karl Josephy, Los Angeles; Richard R. Baggarley, Arcadia, both of Calif.

[73] Assignee: Avery International Corporation, San Marino, Calif.

[21] Appl. No.: 168,192

[22] Filed: Jul. 10, 1980

[51] Int. Cl.³ .............................................. B23K 27/00
[52] U.S. Cl. ...................... 219/121 LH; 219/121 LJ; 219/121 LP; 356/138
[58] Field of Search .... 219/121 L, 121 LM, 121 LG, 219/121 LH, 121 LJ, 121 LP, 121 LR, 121 LY, 121 LU; 350/292, 293, 296; 356/138

[56] References Cited

U.S. PATENT DOCUMENTS

| | | | |
|---|---|---|---|
| 2,759,393 | 8/1956 | McLeod | 356/138 |
| 3,419,321 | 12/1968 | Barber et al. | 219/121 LK X |
| 3,909,582 | 9/1975 | Bowen | 219/121 LJ |
| 3,965,327 | 6/1976 | Ehlscheid et al. | 219/121 LQ X |
| 4,069,080 | 1/1978 | Osborne | 219/121 LR X |

*Primary Examiner*—C. L. Albritton
*Attorney, Agent, or Firm*—Christie, Parker & Hale

[57] ABSTRACT

A process and apparatus for forming a line of weakness in the protective backing of an adhesive laminate is disclosed. The process is performed by generating a laser beam of sufficient energy to vaporize at least a portion of the protective backing of an adhesive laminate. The laser beam is focused in a focal line extending across the protective backing for a time sufficient for vaporizing at least a portion of the protective backing. At least a portion of the protective backing is vaporized with the laser beam to a depth sufficient for forming a line of weakness in the protective backing along the focal line.

35 Claims, 5 Drawing Figures

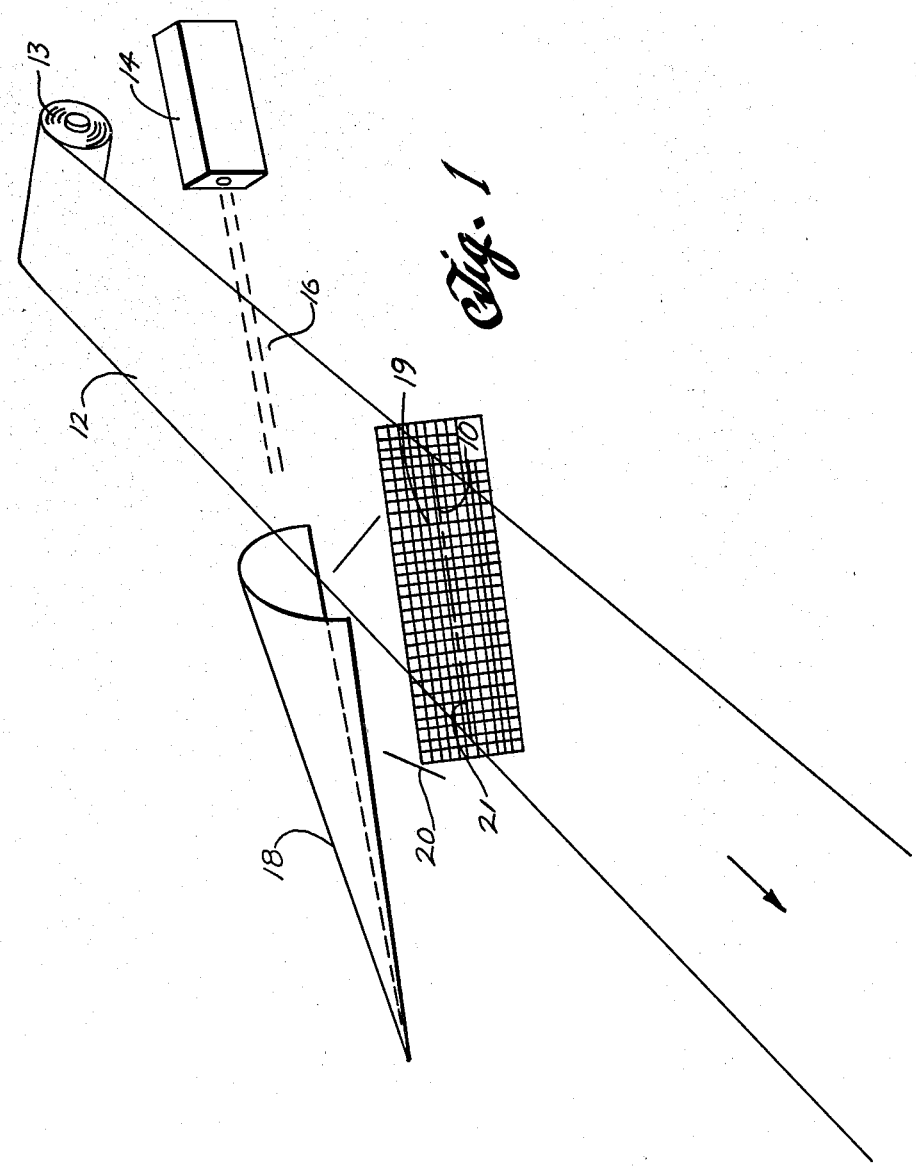

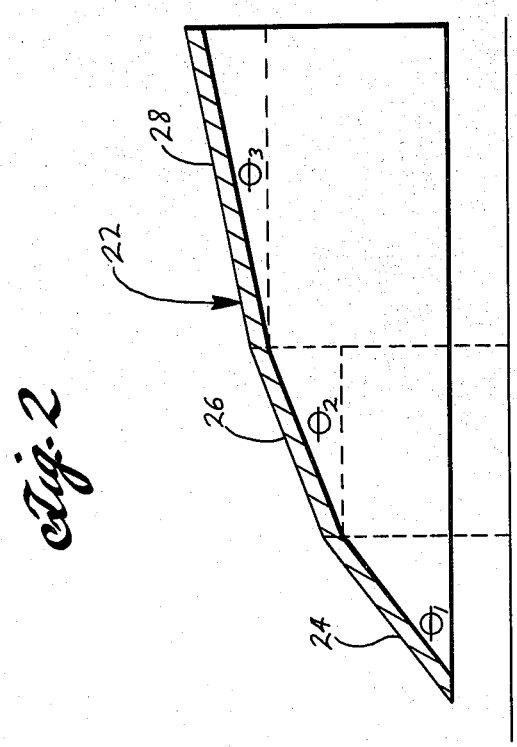

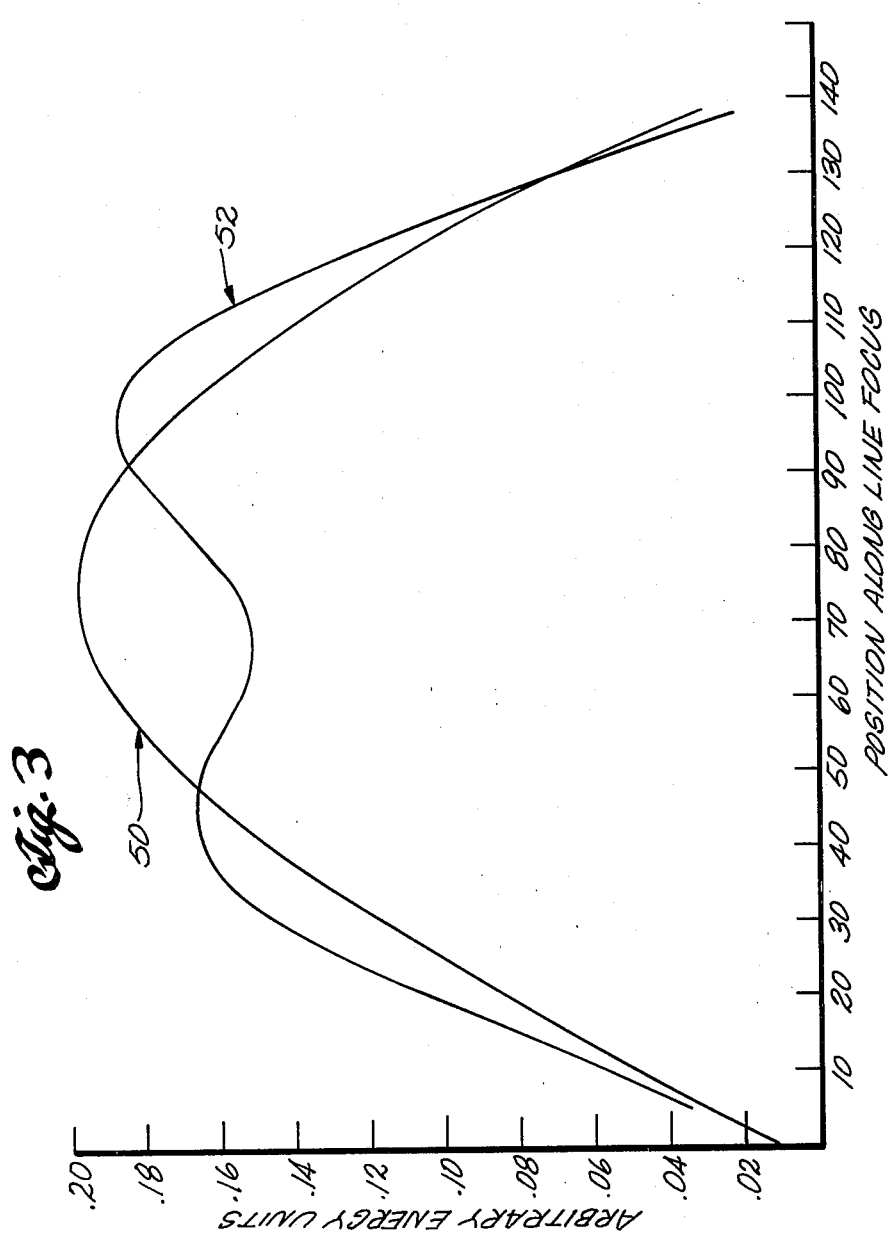

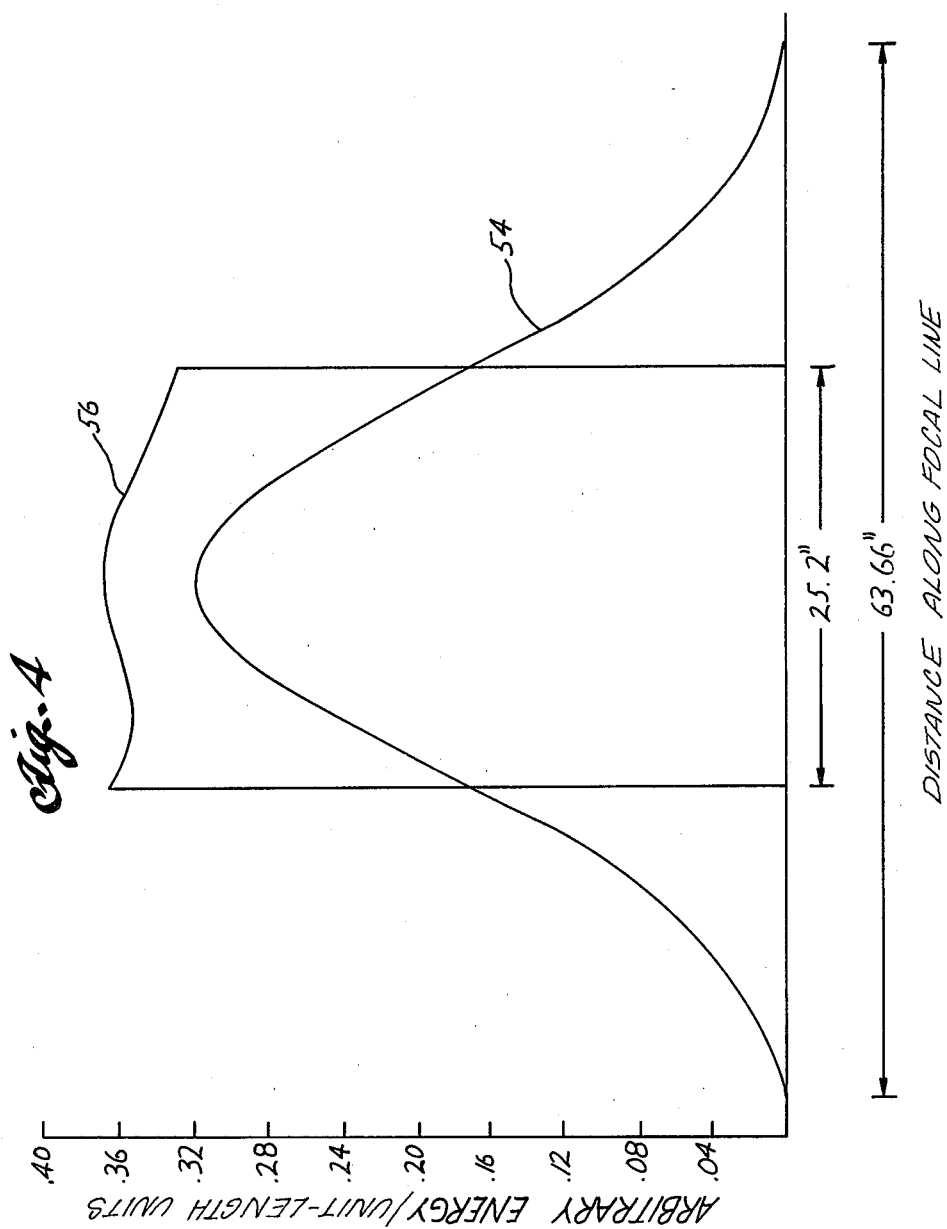

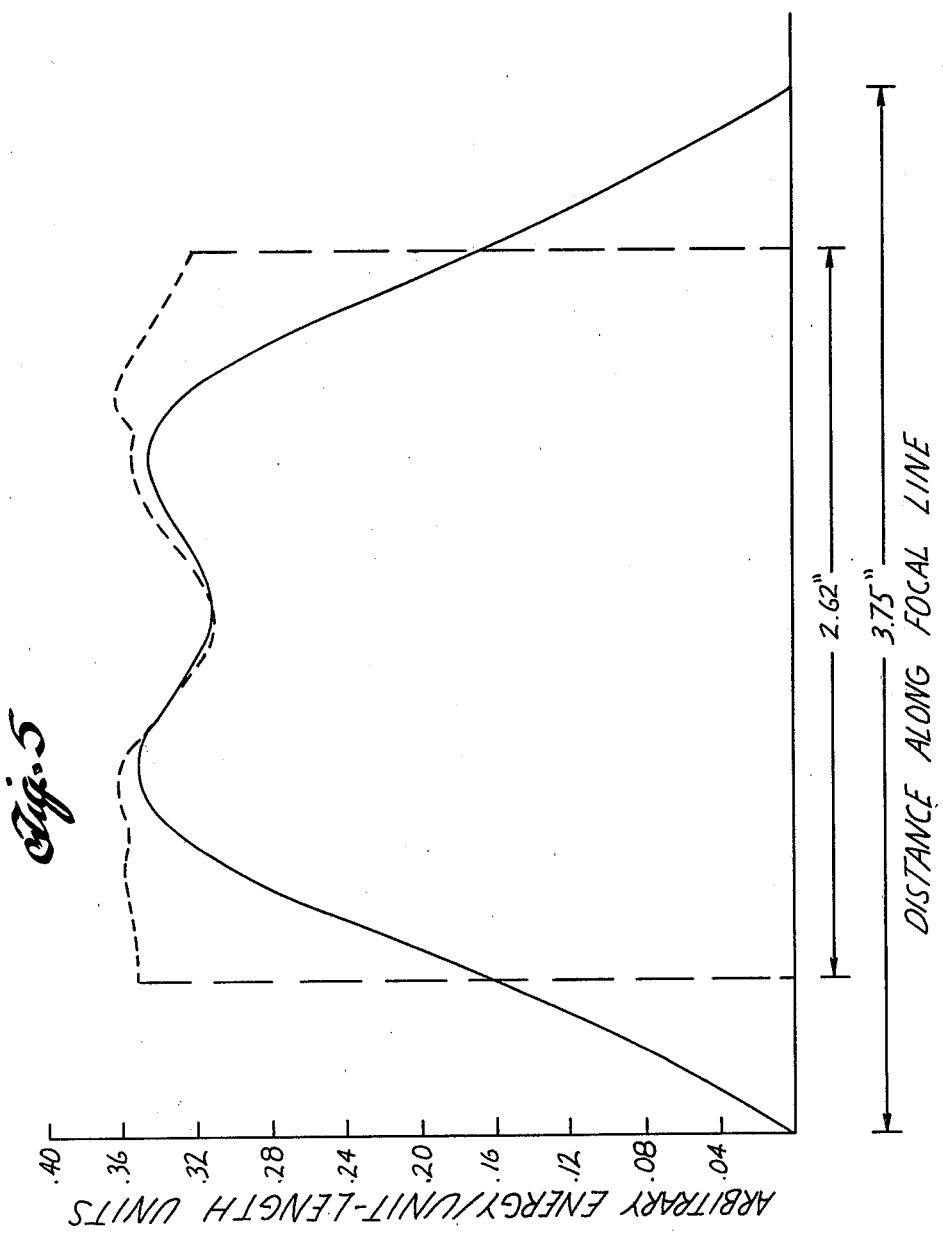

PROCESS FOR PRODUCING LINES OF WEAKNESS IN THE PROTECTIVE BACKING OF AN ADHESIVE LAMINATE

BACKGROUND OF THE INVENTION

The present invention relates to a process for forming a line of weakness in a protective backing of an adhesive laminate. In particular, the process forms a line of weakness in the protective backing by focusing laser light along a focal line extending across the protective backing. The laser beam has sufficient energy density to vaporize at least a portion of the protective backing along the focal line, forming a line of weakness extending across the backing.

Adhesive laminates having removable backings have been modified in a variety of ways to facilitate removal of the protective backings protecting the adhesive layer within the laminate structure. U.S. Pat. No. 3,230,649 to Karn describes adhesive laminates such as label stock in which the backing has a plurality of discontinuous cuts so arranged that when a label of a certain minimum size is cut from the stock, at least one cut or portion of a cut will be found on the backing of the label. Both curved and straight cuts are shown, as well as cuts which extend only part of the way through the thickness of the backing sheet. Although such discontinuous cuts offer convenient starting points for removing the backing, it would often be necessary to remove the backing in more than two pieces because the backing would tend to tear irregularly between the cuts.

U.S. Pat. No. 3,006,793 to Wheeler describes adhesive laminates having backing sheets which can be removed in, at most, two pieces regardless of the size of the sheet being removed. The backing sheet has a number of embrittled zones or lines extending thereacross. The embrittled zones are formed by applying an acid, such as sulfuric acid, or by using heat or ultraviolet radiation to embrittle narrow strips across the backing. The patent teaches that when the laminate is bent sharply away from the backing side along such a line of embrittlement, the backing cracks along the line forming two continuous pieces of backing. The backing sheet has sufficient tensile strength in the embrittled zones so that it does not crack in the zones unless deliberately bent more than is necessary to separate the backing from the rest of the laminate structure. Thus, the backing of a particular label containing many lines of embrittlement may be cracked selectively along one line of embrittlement and then removed in two continuous pieces. The ability of such a backing to be removed in, at most, two continuous pieces, which is referred to herein as "pull-across" is highly desirable, particularly with regard to large labels which have many such embrittled zones.

U.S. Pat. No. 3,859,157 to Morgan describes adhesive laminates having backing sheets in which weakened areas or score lines are formed by mechanical crushing of the fibers of the backing. When the laminate is flexed away from the backing side, the backing ruptures at the score line offering an easy starting point for removal of the backing. The score lines are made continuous or discontinuous to leave sufficient strength in the backing sheet whereby it can be readily further processed without any danger of splitting or tearing. Such a backing is not readily removed in, at most, two pieces because the discontinuities in the score lines are on the order of one-fourth to one-half inch long and spaced at intervals of one to four inches. Such discontinuities prevent the backing from cracking clearly and evenly, and the backing would tend to tear irregularly between the score lines.

U.S. Pat. No. 3,909,582 to Bowen, incorporated herein by this reference, describes a method for forming a line of weakness such as a tear line in a laminate with the use of a laser. Described laminates may include layers of adhesive and layers of paper. The use of a pulsed carbon dioxide layer and the selective scoring of a paper layer of a laminate are also described. The laser light is directed toward the line of weakness to be formed. To form a score line either the laser or the material to be scored must be moved. The patent does not describe adhesive laminates having pressure-sensitive adhesives and backing sheets which can be cracked along a line of weakness by bending the laminate and removing the backing in, at most, two pieces and in which a line of weakness is formed by one pulse of the laser.

SUMMARY OF THE INVENTION

The process herein is a process for forming a line of weakness in the protective backing of an adhesive laminate. The process comprises generating a laser beam of sufficient energy density to vaporize at least a portion of the protective backing of an adhesive laminate. The laser beam of radiation is formed along a focal line extending across the protective backing of the adhesive laminate. At least a portion of the protective backing is vaporized along the line of impingement of the focused laser beam. The protective backing is vaporized to a sufficient depth for forming a line of weakness in the protective backing. The line of weakness is formed such that the protective backing cracks or ruptures along the line of weakness when the adhesive laminate is bent toward the base web side along the line of weakness, and the protective backing has sufficient tensile strength through a non-cracked line of weakness during separation of the protective backing from the base web and adhesive unless the backing is bent more than is necessary to accomplish such a separation.

The process is preferably performed by generating a laser beam of light having sufficient energy density to vaporize at least a portion of the protective backing to a sufficient depth to form a line of weakness. The laser light is directed to a reflective surface (reflector) for focusing the laser light to a focal line on the protective backing. Preferably, the reflector is a reflective axicon or reflective segmented axicon. The laser beam is incident on an off axis segment of the axicon so the backing does not intercept the laser beam before it is reflected from the axicon surface. The linearly focused laser light vaporizes at least a portion of the protective backing on which it impinges forming a line of weakness extending across the backing.

In the preferred practice of the process herein, an adhesive laminate comprising a base web, adhesive layer and protective backing upon the adhesive layer is continuously passed past a laser light source and reflective surface. The laser light source is a pulsed laser which intermittently generates a pulse of laser light. The laser is pulsed to provide laser light which, when focused by the reflective surface, impinges upon the moving adhesive laminate at intervals. A continuous adhesive laminate is formed which has a plurality of lines of weakness extending across the protective backing and which lines of weakness are spaced at intervals along the length of the adhesive laminate.

The laser light that is reflected by the reflective surface is preferably laser light having an intensity minimum ($TEM_{01*}$ mode) at the center of the laser ligh beam. Such a laser light beam can be reflected to provide a more evenly distributed energy density along the focal line than when a Gaussian laser light beam ($TEM_{00}$ mode), which has a maximum intensity at the beam center, is reflected. An even distribution of the energy density within the laser light along the focal line provides a more uniform line of weakness across the protective backing.

The energy of the laser light can also be distributed more evenly along a line extending across the protective backing by utilizing a segmented reflective surface. The segmented reflective surface utilized has a plurality of segments with each segment comprising a reflective axicon. Generally, the separate reflective axicons have different reflective angles to provide a more even energy distribution. Each segment is situated to reflect the laser light along a focal line coinciding with the focal lines of the other segments. Preferably, the segmented section closest to the laser will have the smallest angle with respect to the focal line and the segment farthest from the laser will have the largest angle with respect to the focal line.

BRIEF DESCRIPTION OF THE DRAWINGS

FIG. 1 is a schematic illustration of apparatus for performing the process herein;

FIG. 2 is a schematic illustration of a segmented reflective axicon in cross-sectional view, which can be used in the process herein;

FIG. 3 is a graph showing the energy per unit length along the focal line of normal laser light and laser light having an intensity minimum at the center as a function of the position along the focal line;

FIG. 4 is a graph comparing the laser light energy per unit length as a function of position along the focal line for a three segment axicon versus a one segment axicon with the impinging laser beam being operated in a normal Gaussian mode or $TEM_{00}$ mode; and FIG. 5 is a graph comparing the laser light energy per unit length as a function of position along the focal line for a three segment axicon versus a one segment axicon with the impinging laser beam being in the "doughnut" or $TEM_{01*}$ mode.

DETAILED DESCRIPTION OF THE INVENTION

The adhesive laminates upon which the process herein is practiced comprise a base web, a coating of pressure-sensitive adhesive on at least one major surface of the base web, and a fibrous protective backing removably adhered to the coating of adhesive for protecting and containing the adhesive. Such laminates can be used as label stock, decorative adhesive sheeting, double-stick sheeting such as mountings for photographs, double-stick adhesive tapes and the like.

The protective backing can be of any material that can be cracked or ruptured by bending along a line of weakness extending across the protective backing. The essential property of the protective backing is that the protective backing can be cracked cleanly and evenly along the line of weakness when the laminate of which the backing is a part is bent toward the base web side, the degree of bending preferably being insufficient to cause creasing or other damage to the base web. One material having this quality is Kraft paper. Kraft paper is also an economical backing material commonly used in pressure-sensitive adhesive laminates. Other papers and other fibrous materials, such as synthetic cellulosic materials, cloth, and nonwoven synthetic fabrics can also display the desired property when the average length of the fibers is small or when the individual fibers are relatively brittle. Nonfibrous materials, such as polymer films, can have the desired property when they are relatively brittle or have low tensile strength and have low elongation when stretched to the breaking point.

Evaluation of a proposed backing material is best conducted by testing the proposed backing material when applied to an adhesive laminate under the actual conditions of use. In this manner, the best process for forming the line of weakness can be determined, that is, the amount of protective backing material vaporized by the laser light can be attenuated to provide the degree of crackability and pull-across for the particular backing material. Paper is preferred for the protective backing material because of its relatively low cost and good performance in forming adhesive laminates. The protective backing can have a release coating, such as a silicone release coating on the side of the protective backing in contact with the adhesive layer.

The process for forming the line of weakness in the protective backing is described with regard to the drawings. With regard to FIG. 1, a line of weakness 10 on an adhesive laminate 12 is formed by impinging on the backing a laser light having a sufficient energy density to vaporize at least a portion of the backing. Such light can be provided by a laser or laser light source. In FIG. 1 a laser 14 emits a laser beam 16 of sufficient energy density to vaporize at least a portion of the backing on the adhesive laminate 12. Lasers useful for scoring the backing of an adhesive laminate in accordance with the practice of the method herein are known and are available commercially. The commercially available lasers are acceptable for the practice of the process herein. Industrial lasers include gaseous lasers, such as carbon dioxide or helium neon lasers; solid state light pumped lasers such as ruby neodymium-yttrium, aluminum garnet (Nd-YAG) lasers, or glass lasers; semiconductor lasers such as gallium arsenide lasers; plastic lasers; and lasers using conjugated organic molecules, such as benzene, toluene, or naphthalene.

The choice of a laser for scoring depends on the material of the backing. Paper essentially absorbs the infrared output of a gaseous carbon dioxide laser having a wavelength of 10.6 microns. Such a laser is thus preferred in the practice of the process when the protective backing of the adhesive laminate is paper. One such carbon dioxide laser is available from Coherent Radiation of Palo Alto, Calif.

The laser light beam 16 is directed to a reflective surface 18. As shown in FIG. 1 the reflective surface 18 is a section of a reflective axicon. Transmissive, or refractive, axicons can also be used. An axicon is herein defined as any figure of revolution that by reflection, or refraction, or both, will bend light from a point source on the axis of the figure of revolution so as to cross the axis not at a point, as would be the case with a lens, but along a continuous line of points along a substantial extent of the axis. The reflective surface 18 in FIG. 1 is a section of a flat cone, i.e, half of a frustrum of a cone divided by a plane passing through its axis. Other forms of axicons, such as rings, cylinders, cones, etc. can also be used as the reflective surface.

The laser light beam 16 strikes the reflective surface 18 and is reflected in a linear fashion to a focal line rather than to a focal point. The reflective surface 18 has a curvature such that the laser beam 16 is focused to a narrow focal line. The length of the focal line is determined by the diameter of the laser beam and the angle of the cone and is given approximately by the formula:

$$L = R/[Cot(2\theta)]$$

wherein R is the laser beam radius and $\theta$ is the cone angle as shown in FIG. 2, given that the axis of the cone is in the plane of the paper.

Preferably, the reflective surface 18 is selected which provides a focal line that extends at least the width of the adhesive laminate. If the focal line does not extend completely across the width of the protective backing, the line of weakness will also not extend across the protective backing. More preferably, the reflective surface is selected such that the focal line extends diagonally across the adhesive laminate. A reflective surface can be selected, therefore, which provides a focal line greater than the width of the adhesive laminate 12.

Generally, the distribution of energy per unit length along the focal line of the laser light reflected from a reflective surface is a single peaked curve, as shown in FIG. 3, by curve 50. Thus, the energy density is at a minimum along the ends of the focal line and increases to a greater energy density near the center of the focal line. Such a distribution of the energy density can be undesirable as it can lead to a burning of the protective backing in the center of the focal line and can lead to lines of weakness near the edges of the protective backing which are incapable of providing the desired crackability when the protective backing is flexed. Therefore, a reflective surface can be selected which provides a sufficient energy density along the desired length of the focal line extending across the protective backing of the adhesive laminate. That is, only a portion of the total possible focal line from the reflective surface, having the desired energy density is utilized to form the line of weakness in the protective backing.

To provide an even distribution of the energy density in the laser light beam plurality of reflective surfaces such as a segmented axicon can be utilized. Such a segmented axicon is shown in FIG. 2 in cross section. The segmented axicon 22 comprises a plurality of segments of separate axicons. Each segment is a segment of an axicon having a different angle of reflection but each focusing along the same focal line. With reference to FIG. 2 the segmented axicon 22 shown therein comprises three segments. A first segment 24 of the segmented axicon 22 farthest from the laser is a section of a conical axicon having an angle $\theta_1$ of reflection with respect to the focal line that is the largest angle for the three segments. The first segment can reflect laser light along a focal line such that the greatest energy density of the light is near an edge of the protective backing rather than the center. A second segment 26 of the segmented axicon 22 has an angle $\theta_2$ of reflection that is less than the angle of the first segment 24. Such a second segment 26 can reflect the laser light along a focal line coinciding with the focal line of the first segment 24. However, the greatest energy density along the focal line of the second segment 26 is at a location along the coinciding focal line other than the location of the greatest energy density from the first segment 24. For example, the greatest energy density from such a second segment can be nearly centered along the focal line extending across the protective backing. A third segment 28 is provided which has relatively the smallest angle $\theta_3$ of reflectance for the laser light. The third segment reflects the laser light along a focal line coinciding with the focal lines of the first and second segments. The greatest energy density for the reflected laser light along the focal line of the third segment can be nearer the remaining edge of the protective backing rather than nearer the center or locations of greatest energy density for the first and second segments. Using such a segmented reflective axicon 22 provides distribution of the energy density in the laser light 16 along a focal line 21 in the protective backing of the adhesive laminate structure.

The energy density along the line of weakness and the protective backing of the adhesive laminate structure can also be made more uniform along the length of the line of weakness by using a laser light beam that has an intensity minimum in the center of the light beam. As an example, the laser can be operated in the "doughnut" or $TEM_{01*}$ mode. Such doughnut laser light provides an energy distribution along a focal line when reflected from a reflective surface as is shown in FIG. 3 by the curve 52. As can be seen in FIG. 3, the curve 52 is a double-peaked curve. The energy density along the focal line is distributed more evenly using such a doughnut mode than when Gaussian laser light is used as can be seen in a comparison of the two curves 52 and 50. Curve 52 is broader and has the energy density more evenly distributed along the focal line. In addition, the greatest energy density at any one location along the focal line for the reflected doughnut laser light is lower than the greatest energy density at any one location for the normal laser light. For example, with reference to FIG. 3, if it requires 0.14, of the energy units shown on the graph to provide a line of weakness in the protective backing of an adhesive laminate structure which will crack and also provide pull-across, a longer line of weakness can be obtained using a laser operated in the doughnut mode rather than a laser operated in the more normal Gaussian $TEM_{00}$ mode. Also, if an energy density greater than 0.19 energy units is too great an energy density and burns through the protective backing, the doughnut laser light could avoid such a high energy density concentration in any one position along the focal line whereas the normal laser light would cause a burning of the protective backing near the center.

A laser beam with an intensity minimum at its center can be provided by suitable operation of the laser light source or by the use of optics. For example, some commercially available lasers can be operated in a doughnut mode wherein the laser light emitted has a minimum intensity at the center.

Again, with regard to FIG. 1, the practice of the method herein is performed by passing the adhesive laminate having a protective backing thereon through or near the focal line of the reflective surface 18. The adhesive laminate 12 passes through or near the focal line 21 of the reflective surface 18 with the protective backing surface of the adhesive laminate facing the reflective surface 18. The adhesive laminate 12 is passed through or near the focal line 21 such that the width of the line of weakness corresponding to the width of the reflected and focused line of laser light impinging upon the protective backing, is sufficient to provide the line of weakness in the protective backing. That is, the adhesive laminate is spaced from the reflective surface at a distance which provides the desired width (and thereby energy density) to the reflected laser light that strikes the protective backing. For example, the width of the line of reflected laser light striking the protective backing is from about 0.002 to about 0.02 inch.

In the preferred method herein, the line of weakness is formed in the protective backing of a continuous adhesive laminate by positioning the adhesive laminate such that the protective backing faces the reflective surface. A laser beam is then directed to the reflective surface and reflected onto the protective backing forming the line of weakness. In the method illustrated in FIG. 1, a continuous adhesive laminate 12 from a roll 13 is passed through or near the focal line 21 of the reflective surface. The adhesive laminate 12 continuously passes by the reflective surface and through the focal line 21. To provide the line of weakness 10 on the protective backing of the adhesive laminate, the laser 14 is pulsed to provide a plurality of lines of weakness extending across the protective backing and spaced along the length of the adhesive laminate 12. Each line of weakness 10 corresponds to a pulse of the laser 14. By timing the pulses emitted by the laser 14 and the speed at which the adhesive laminate 12 passes through the focal line 21, a plurality of lines of weakness 10 can be formed on the protective backing spaced apart at desired spacings.

A typical backing, such as Kraft paper, has a thickness in a range of about 0.001 to about 0.01 inch, typically about 0.002 to about 0.006 inch. It is desirable to regulate the depth of the line of weakness in the protective backing to at least about 60 percent of the thickness of the backing sheet. The depth of the line of weakness can be controlled by controlling the energy and time of the laser light pulse. That is the energy of the laser light per unit area of the protective backing per unit time affects the depth of the line of weakness formed in the protective backing. The speed of the adhesive laminate is also a factor in determining the energy density.

The laser light focused along the focal line 21 provides vaporization of the fibers in the protective backing. That is, the laser light impinging upon the surface along the focal line is of sufficient energy density to vaporize at least a portion of the protective backing along the focal line 21.

The depth of the vaporization in the protective backing along the line of weakness provides the crackability and pull-across characteristics described herein. The present method provides an acceptable means for controlling the depth of vaporization of the protective backing as the laser intensity and distance from the reflective surface to the protective backing can be carefully monitored and controlled to provide the desired depth of vaporization. State-of-the-art methods of vaporizing portions of the backing to provide lines of weakness which utilize moving laser light sources back and forth across the material to be scored or scanned, laser beams find it difficult to maintain adequate focus along a wide web. In addition, the rapid changes of direction needed to produce additional score lines using such methods can be deleterious to the laser light sources and the optics employed for focusing the laser light onto the surface to be scored. The method proposed using axicons or segmented axicons to generate the line of weakness does not suffer from these deficiencies.

The ability of the backing to crack or rupture along a line of weakness to form two separate pieces, herein referred to as "crackability," is an essential feature of adhesive laminates prepared by the method herein. Crackability enables the backing sheet to be divided cleanly into two pieces, each of which can be removed separately from the adhesive laminate.

In order to achieve such crackability, the lines of weakness are formed in the protective backing as continuous lines of weakness extending across the protective backing and intersecting the edges of the adhesive laminate.

A discontinuous line of weakness can be formed in the protective backing of the adhesive laminate by the method and apparatus herein. To form such a discontinuous line of weakness non-scored or lesser-scored segments are left along the line of weakness. The non-scored segments can be formed by placing an appropriate mask 19 over the adhesive laminate to intercept the reflected laser light and prevent it from striking the protective backing. Such a mask can be a grid or wire screen.

The depth of the line of weakness formed by the vaporization of at least a portion of the protective backing is greater than zero and preferably at least about 60 percent of the thickness of the protective backing. The depth of the line of weakness in the protective backing is regulated in the range of greater than zero to about the thickness of the backing. The depth of vaporization varies within this range to provide acceptable crackability depending upon the selection of the material comprising the protective backing. Preferably, to preserve the strength and appearance of the base web, e.g., the label face, the depth of the score line does not extend into the base web. It is also preferred that the depth of the line of weakness not extend into the adhesive layer underlying the protective backing in order to prevent bleeding of the adhesive through the protective backing.

The depth of the line of weakness can also be regulated for providing cutting of the adhesive laminate. The apparatus and method herein can thus be used for cutting an adhesive laminate quickly and efficiently in desired lengths.

The following examples serve to illustrate the practice of the method herein.

EXAMPLE 1

A pulsed carbon dioxide laser, emitting infrared radiation of 10.6 microns in wavelength with a pulse energy of 100 joules and a repetition rate of 10 pulses per second, is focused to a focal line by directing the laser light to a reflective flat conical axicon.

An adhesive laminate having a Kraft paper protective backing is passed through the focal line of the reflective axicon. The location of the focal line is at about the axis of the flat cone. The adhesive laminate intercepts the axis of the flat cone axicon. The focal line has a width of about 0.01 inch at the location of impingement of the reflected laser light upon the surface of the protective backing.

The laser is pulsed and the duration of each full intensity pulse is about 100 $\mu$sec. The adhesive laminate passes through the focal line at a rate of about 150 feet per minute.

As a result of pulsing the laser and moving the adhesive laminate, a plurality of lines of weakness are formed along the length of the adhesive laminate in the protective backing. The lines of weakness form as a result of the vaporization of at least a portion of the protective backing as the laser light strikes the protective backing and because of the energy density in the laser light.

The resulting score line displays excellent crackability and pull-across features.

EXAMPLE 2

A flat cone axicon reflector approximately 85 inches long and having a cone angle less than about 1° is positioned having its larger end directed toward a laser light source. This reflector is placed at about a 45° angle to the direction of travel of an adhesive laminate lying below the reflector. The adhesive laminate intercepts the conical axis of the reflector with the protective backing surface on the upper surface facing the reflector.

The web of adhesive laminate is passed through the conical axis, which is also the focal line of the reflector, and the laser light source is intermittently pulsed. The laser beam of about ½ inch in diameter strikes the reflector and is focused onto the protective backing of the adhesive laminate passing below the reflector. The laser light intercepts the adhesive laminate along a line at a 45° angle and extends diagonally thereacross.

The energy density of the laser light striking the adhesive laminate is sufficient to vaporize at least a portion of the protective backing to a depth at least about 60 percent of the thickness of the protective backing.

The vaporization of at least a portion of the protective backing forms a line of weakness therein. With each pulse of the laser a line of weakness is formed in the protective backing which is spaced apart from the other lines of weakness because of the movement of the web of adhesive laminate.

EXAMPLE 3

The procedure of Example 1 is repeated in every essential detail. The laser is operated in the Gaussian mode (TEM$_{00}$) having a beam radius of 0.5 inch. The laser is positioned such that the center of the laser light strikes a one-segmented axicon 4.11 inches above the focal line. The reflective axicon has a cone angle of 0.45°.

The curve 54 shown in FIG. 4 is representative of the energy distribution along the focal line for the reflective axicon. The length along the focal line which receives an energy density within ±5.6% of the average energy density of the laser light beam is about 7.7 inches.

EXAMPLE 4

The procedure of Example 3 is repeated in every essential detail with the exception that a reflective axicon is used having three sections. The cone angles for each of the sections, and as depicted with regard to FIG. 2, are $\theta_1=0.5°$, $\theta_2=0.45°$ and $\theta_3=0.4122°$. The laser light beam is in a Gaussian mode (TEM$_{00}$) and has a radius of 0.5 inch. The center of the laser beam strikes the segmented axicon about 4.11 inches above the focal line.

The energy distribution along the focal line of the laser light beam is represented by curve 56 of FIG. 4.

As can be seen by a comparison of the curves 54 and 56, the segmented axicon provides a more even distribution of the energy of the laser light along the focal line. The length along the focal line which receives an energy density with ±5.6% of the average energy density of the laser light beam is about 25.2 inches.

EXAMPLE 5

The procedure of Example 1 is repeated in every essential detail with the exception that the laser is operated in the doughnut or TEM$_{01*}$ mode. The axicon is a reflective axicon having a cone angle of 9°. The center of the laser light beam, having a diameter of 0.58 inch, is positioned about 8.33 inches above the focal line of the reflective axicon.

The curve 58 in FIG. 5 represents the energy distribution of the laser light along the focal line. As can be seen in a comparison of curves 54 and 58, the "doughnut" mode of operation of the laser provides a more even distribution of the energy of the laser light beam along the focal line than is provided when the laser is operated in the Gaussian mode. The length along the focal line which receives an energy density within ±7% of the average energy density of the laser light beam is about 1.83 inches.

EXAMPLE 6

The procedure of Example 5 is repeated in every essential detail with the exception that a reflective axicon is utilized having three sections. The cone angles for each of the sections, and as depicted in FIG. 2, are $\theta_1=10°$, $\theta_2=9°$ and $\theta_3=8.245°$. The projected lengths of the segments of the reflective axicon on the focal line are 44.9 inches for the segment having a cone angle of 10° and 5.1 inches for the segment having a cone angle of 9°. The laser light beam has a radius of 0.58 inch and is positioned so the center of the laser light beam strikes the reflective axicon about 8.33 inches from the cone axis (focal line).

The curve 60 in FIG. 5 represents the energy distribution of the laser light along the focal line. As can be seen by a comparison of curves 60 and 58, the segmented axicon provides a more even distribution of energy along the focal line than is provided by a non-segmented axicon. The length along the focal line which receives an energy density within ±7% of the average energy density of the laser light is about 2.62 inches.

What is claimed is:

1. A process for forming a line of weakness in the protective backing of an adhesive laminate, the process comprising the steps of:
   (a) generating a laser beam of sufficient energy density to vaporize at least a portion of the protective backing of an adhesive laminate;
   (b) focusing the laser beam in a focal line extending across the protective backing for a time sufficient for vaporizing at least a portion of the protective backing; and
   (c) vaporizing at least a portion of the protective backing with the laser beam to a depth sufficient for forming a line of weakness in the protective backing along the focal line.

2. A process for forming a line of weakness as recited in claim 1 wherein the focusing step comprises directing the laser beam to a reflective surface, reflecting the laser beam to a focal line of the reflective surface, and projecting the reflected laser beam along the focal line and onto the protective backing.

3. A process for forming a line of weakness as recited in claim 1 wherein the protective backing is vaporized to a substantially uniform depth along the focal line.

4. A process forming a line of weakness as recited in claim 1 wherein an energy density of the laser beam is substantially uniform along the focal line.

5. A process for forming a line of weakness as recited in claim 1 wherein the generating step comprises generating a laser beam having an intensity minimum at its center.

6. A process for forming a line of weakness as recited in claim 1 further comprising the steps of continuously passing an adhesive laminate having a protective backing through the focal line and intermittently generating the laser beam for forming a plurality of lines of weakness extending across the protective backing spaced apart along the protective backing.

7. A process for forming a line of weakness as recited in claim 1 wherein the laser beam is focused to a focal line extending diagonally across the protective backing.

8. A process for forming a line of weakness as recited in claim 1 further comprising pulsing the laser beam and passing the adhesive laminate continuously through the focal line for providing a plurality of lines of weakness in the protective backing alone the adhesive laminate spaced apart from each other.

9. A process as recited in claim 1 wherein the vaporizing step provides vaporization of the protective backing and adhesive laminate along the focal line for cutting the adhesive laminate.

10. A process as recited in claim 1 further comprising masking the protective backing with a mask for intercepting the focused laser light beam and for forming a discontinuous line of weakness extending across the protective backing.

11. Apparatus for forming a line of weakness in a protective backing of an adhesive laminate, the apparatus comprising:
 (a) a laser for generating a laser light beam having sufficient energy density for vaporizing at least a portion of the protective backing;
 (b) a segmented reflective axicon capable of focusing the laser light beam to a focal line positioned for receiving the laser light beam, and focusing the laser light bean to a focal line projected on the protective backing; and
 (c) means for supporting the adhesive laminate at about the focal line.

12. Apparatus as recited in claim 11 wherein the reflective axicon is a segmented axicon comprising a plurality of segments having differing angles of reflectance.

13. Apparatus as recited in claim 11 further comprising means for advancing the adhesive laminate and for maintaining the adhesive laminate at about the focal line and means for pulsing the laser for providing a focused laser light beam which intermittently impinges upon the protective backing of the adhesive laminate for forming a plurality of lines of weakness spaced apart along the protective backing.

14. Apparatus as recited in claim 11 further comprising means for intercepting the focused laser light beam spaced between the focusing means and the adhesive laminate.

15. Apparatus as recited in claim 14 wherein the means for intercepting the focused laser light comprises a wire grid supported between the adhesive laminate and means for focusing the laser light beam.

16. Apparatus for forming a line of weakness in a protective backing of an adhesive laminate, the apparatus comprising:
 (a) a laser for generating a laser light beam having a minimum intensity at its center and sufficient energy density for vaporizing at least a portion of the protective backing;
 (b) a reflective axicon selectively positioned for receiving the laser light beam, and focusing the laser light beam to a focal line projected on the protective backing; and
 (c) means for supporting the adhesive laminate at about the focal line.

17. Apparatus as recited in claim 16 further comprising means for advancing the adhesive laminate and for maintaining the adhesive laminate at about the focal line, and means for pulsing the laser for providing a focused laser light beam which intermittently impinges upon the protective backing of the adhesive laminate for forming a plurality of lines of weakness spaced apart along the protective backing.

18. Apparatus as recited in claim 16 further comprising means for intercepting the focused laser light beam spaced between the focusing means and the adhesive laminate.

19. Apparatus as recited in claim 18 wherein the means for intercepting the focused laser light comprises a wire grid supported between the adhesive laminate and means for focusing the laser light beam.

20. Apparatus for forming a line of weakness in a protective backing of an adhesive laminate, the apparatus comprising:
 (a) a laser for generating a laser light beam having a minimum intensity at its center and sufficient energy density for vaporizing at least a portion of the protective backing;
 (b) a segmented axicon comprising a plurality of segments having differing reflectance for focusing the laser light beam to a focal line positioned for receiving the laser light beam, and focusing the laser light beam to a focal line projected on the protective backing; and
 (c) means for supporting the adhesive laminate at about the focal line.

21. Apparatus as recited in claim 20 wherein the angle of reflectance decreases for each axicon segment beginning with the axicon segment farthest from the laser and ending with the axicon segment closest to the laser.

22. Apparatus as recited in claim 20 further comprising means for intercepting the focused laser light beam spaced between the focusing means and the adhesive laminate.

23. Apparatus as recited in claim 22 wherein the means for intercepting the focused laser light comprises a wire grid supported between the adhesive laminate and means for focusing the laser light beam.

24. Apparatus for forming a line of weakness in a protective backing of an adhesive laminate, the apparatus comprising:
 (a) a laser for generating a laser light beam having a single peaked curve and sufficient energy density for vaporizing at least a portion of the protective backing;
 (b) a segmented axicon comprising a plurality of segments having differing angles of reflectance for focusing the laser light beam to a focal line positioned for receiving the laser light beam, and focusing the laser light beam to a focal line projected on the protective backing; and
 (c) means for supporting the adhesive laminate at about the focal line.

25. Apparatus as recited in claim 24 wherein the angle of reflectance decreases for each axicon segment beginning with the axicon segment farthest from the laser and ending with the axicon segment closest to the laser.

26. Apparatus as recited in claim 24 further comprising means for advancing the adhesive laminate and for maintaining the adhesive laminate at about the focal line, and means for pulsing the laser for providing a focused laser light beam which intermittently impinges upon the protective backing of the adhesive laminate for forming a plurality of lines of weakness spaced apart along the protective backing.

27. Apparatus as recited in claim 24 further comprising means for intercepting the focused laser light beam spaced between the focusing means and the adhesive laminate.

28. Apparatus as recited in claim 27 wherein the means for intercepting the focused laser light comprises a wire grid supported between the adhesive laminate and means for focusing the laser light beam.

29. A process for forming a line of weakness in the protective backing of an adhesive laminate, the process comprising the steps of:
    (a) generating a laser beam having a minimum intensity at the center thereof and of sufficient energy density to vaporize at least a portion of the protective backing of an adhesive laminate;
    (b) directing the laser beam to a reflective segmented axicon; and
    (c) reflecting the laser beam on at least a portion of the protective backing for a time sufficient to vaporize at least a portion of the protective backing with the laser beam along a line to a depth sufficient to form a line of weakness of substantially uniform depth in the protective backing.

30. A process for forming a line of weakness as recited in claim 29 further comprising continuously passing an adhesive laminate through the reflected laser beam and intermittently generating the laser beam to form a plurality of lines of weakness extending across the protective backing spaced apart along the protective backing.

31. A process for forming a line of weakness as recited in claim 29 wherein the laser beam is focused along a line extending diagonally across the protective backing.

32. A process for forming a line of weakness as recited in claim 29 further comprising pulsing the laser beam and passing the adhesive laminate continuously through the reflected pulsed laser beam to provide a plurality of lines of weakness in the protective backing along the adhesive laminate spaced apart from each other.

33. A process for forming a line of weakness as recited in claim 29 in which the protective backing is moved to intercept the reflected laser beam to form a discontinuous line of weakness extending across the protective backing.

34. Apparatus for forming a line of weakness in a protective backing of an adhesive laminate, the apparatus comprising:
    (a) a laser for generating a laser light beam having sufficient energy density for vaporizing at least a portion of the protective backing;
    (b) a segmented axicon capable of focusing the laser light beam to a focal line positioned for receiving the laser light beam, and focusing the laser light beam to a focal line projected on the protective backing; and
    (c) means for supporting the adhesive laminate at about the focal line.

35. Apparatus for forming a line of weakness in a protective backing of an adhesive laminate, the apparatus comprising:
    (a) a laser for generating a laser light beam having sufficient energy density for vaporizing at least a portion of the protective backing;
    (b) a segmented reflective axicon comprising a plurality of segments having differing angles of reflectance, in which the angle of reflectance decreases for each axicon segment beginning with the axicon segment farthest from the laser and ending with the axicon segment closest to the laser, and capable of focusing the laser light beam to a focal line positioned for receiving the laser light beam, and focusing the laser light beam to a focal line projected on the protective backing; and
    (c) means for supporting the adhesive laminate at about the focal line.

* * * * *